Nov. 15, 1960    F. H. EVANS    2,960,240
SLAB-TURNING APPARATUS AND SELF-FEED MEANS
Filed Sept. 4, 1958    3 Sheets-Sheet 1

INVENTOR
*Frederick H. Evans*

BY *Frease & Bishop*

ATTORNEYS

Nov. 15, 1960
F. H. EVANS
2,960,240
SLAB-TURNING APPARATUS AND SELF-FEED MEANS
Filed Sept. 4, 1958
3 Sheets-Sheet 2
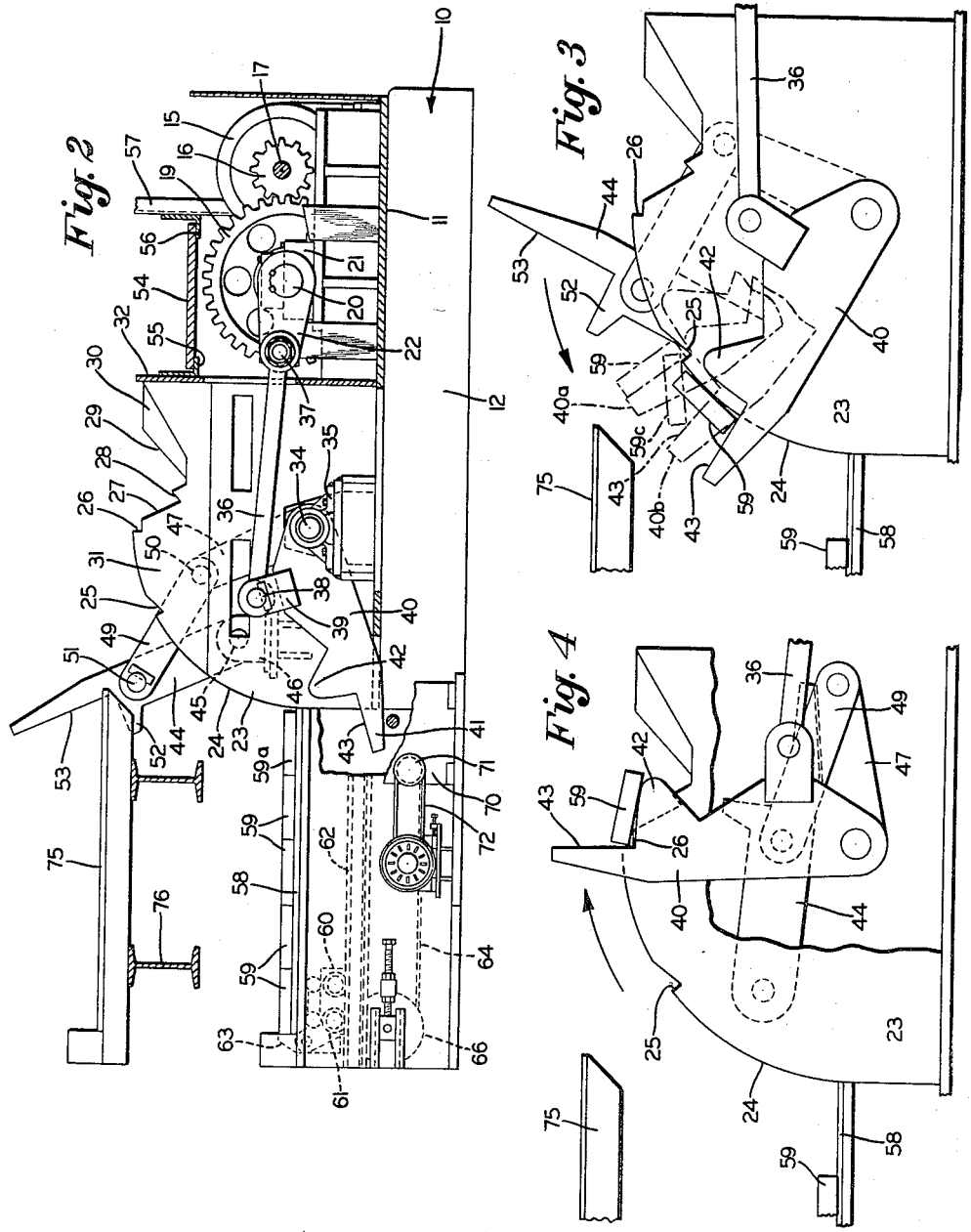
INVENTOR
*Frederick H. Evans*
BY *Frease & Bishop*
ATTORNEYS

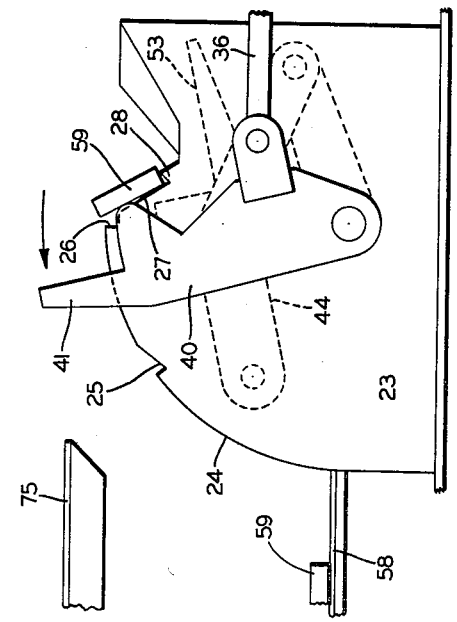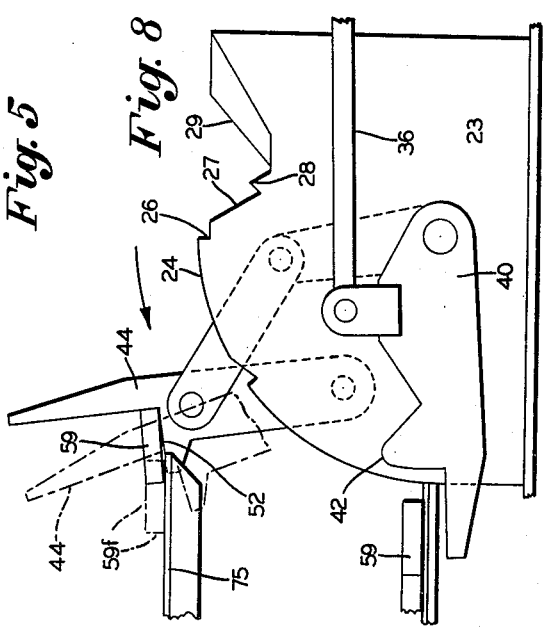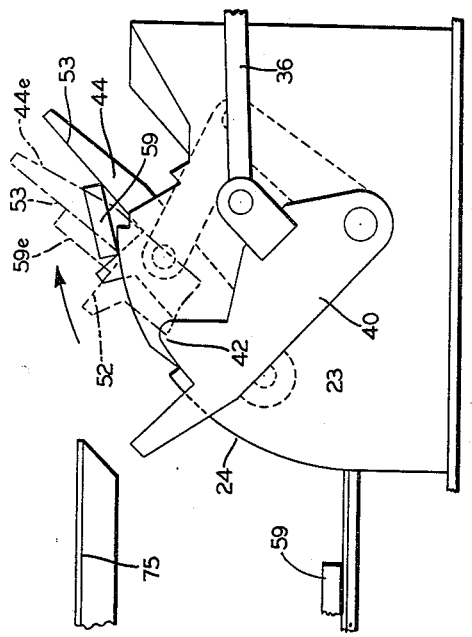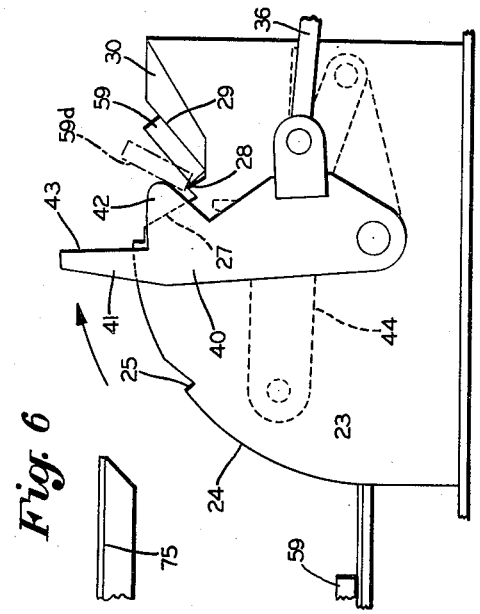

United States Patent Office 2,960,240
Patented Nov. 15, 1960

2,960,240

SLAB-TURNING APPARATUS AND SELF-FEED MEANS

Frederick H. Evans, Massillon, Ohio, assignor to Evans Enterprises, Inc., Massillon, Ohio, a corporation of Ohio Filed Sept. 4, 1958, Ser. No. 758,937

8 Claims. (Cl. 214—1)

The invention relates to apparatus for handling slabs and similar articles, and more particularly to a machine for turning slabs and the like so as to successively present the opposite side faces and edges thereof for inspection, scarfing or similar operations.

Under present steel mill practice, slabs and similar articles, after being rolled, are inspected and marked for scarfing or similar operations which may be necessary to remove inperfections from the surfaces thereof. This necessitates several turning operations upon each slab or similar article so as to successively present each face thereof for such inspection, scarfing or the like.

This turning of the slabs and similar articles is customarily performed manually, which involves considerable time and labor and consequently adds to the cost of production.

Such slab turning apparatuses as are now available require that each slab be placed therein by some independent means such as a crane, lift truck or the like, and after the necessary turning of the slab has been accomplished to permit inspection and scarfing of the several surfaces thereof, it is necessary that the slab be removed from the turning apparatus by such independent means before another slab can be worked upon.

The present invention contemplates the provision of apparatus for turning slabs and similar articles for inspection and scarfing of all surfaces thereof, including self-feeding means for feeding slabs, one at a time, into the turning apparatus, and for discharging the slabs from the turning apparatus after the inspection and scarfing operations have been completed.

Another object of the invention is to provide apparatus for easily and readily turning slabs and the like so as to successively present each face thereof for inspection and scarfing.

A further object of the invention is to provide apparatus of the character referred to comprising novel slab-turning means.

A still further object of the invention is to provide such a slab-turning apparatus having coordinated lift arms and manipulating arms which cooperate to move the slabs upon arcuate, notched rails for turning the slabs to successively present the several surfaces thereof for inspection and scarfing.

Another object of the invention is to provide an apparatus of the character referred to including a charging platform upon which slabs are fed one at a time to the lift arms, and a discharge platform onto which the scarfed slabs are deposited by the manipulating arms.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings.

In general terms, the invention may be briefly described as comprising a spaced pair of arcuate rails having notches therein, a rocker shaft journalled concentric to said arcuate rails, lift arms fixed upon said rocker shaft and projecting beyond the peripheries of said arcuate rails, each lift arm having a rearwardly disposed projection thereon.

A pair of manipulating arms are pivoted at a point eccentric to the arcuate rails, and a forwardly disposed projection is formed upon each manipulating arm. Rocker arms upon the rocker shaft are connected to the manipulating arms by links, and means is provided for oscillating the rocker shaft whereby the lift arms and manipulating arms may be oscillated in desired manner.

A charging platform is located adjacent to one side of the arcuate rails for receiving slabs to be scarfed, and feed means is associated therewith for moving the slabs upon the platform so as to locate them, one at a time, in position to be picked up by the lift arms and moved over the arcuate surfaces of the rails.

The lift arms and manipulating arms are operated to move the slabs over the arcuate rails and through the notches therein to turn the slabs so as to present successive surfaces thereof for inspection and scarfing by workmen standing upon a platform adjacent the side of the rails opposite to the charging platform.

A discharge platform is located above the charging platform, and the manipulating arms are arranged to deposit the scarfed slabs thereon after the completion of the inspection and scarfing operations.

Having thus briefly described the invention, reference is now made to a preferred embodiment thereof illustrated in the accompanying drawings, in which;

Fig. 2 is a side elevation of the apparatus showing the parts in the initial position, with parts broken away to illustrate the drive mechanism.

Figs. 3 through 8 are diagrammatic views showing various positions to which the lift arms and manipulating arms are moved during the operation of the apparatus for turning a slab to successively present all surfaces thereof.

Figure 1:
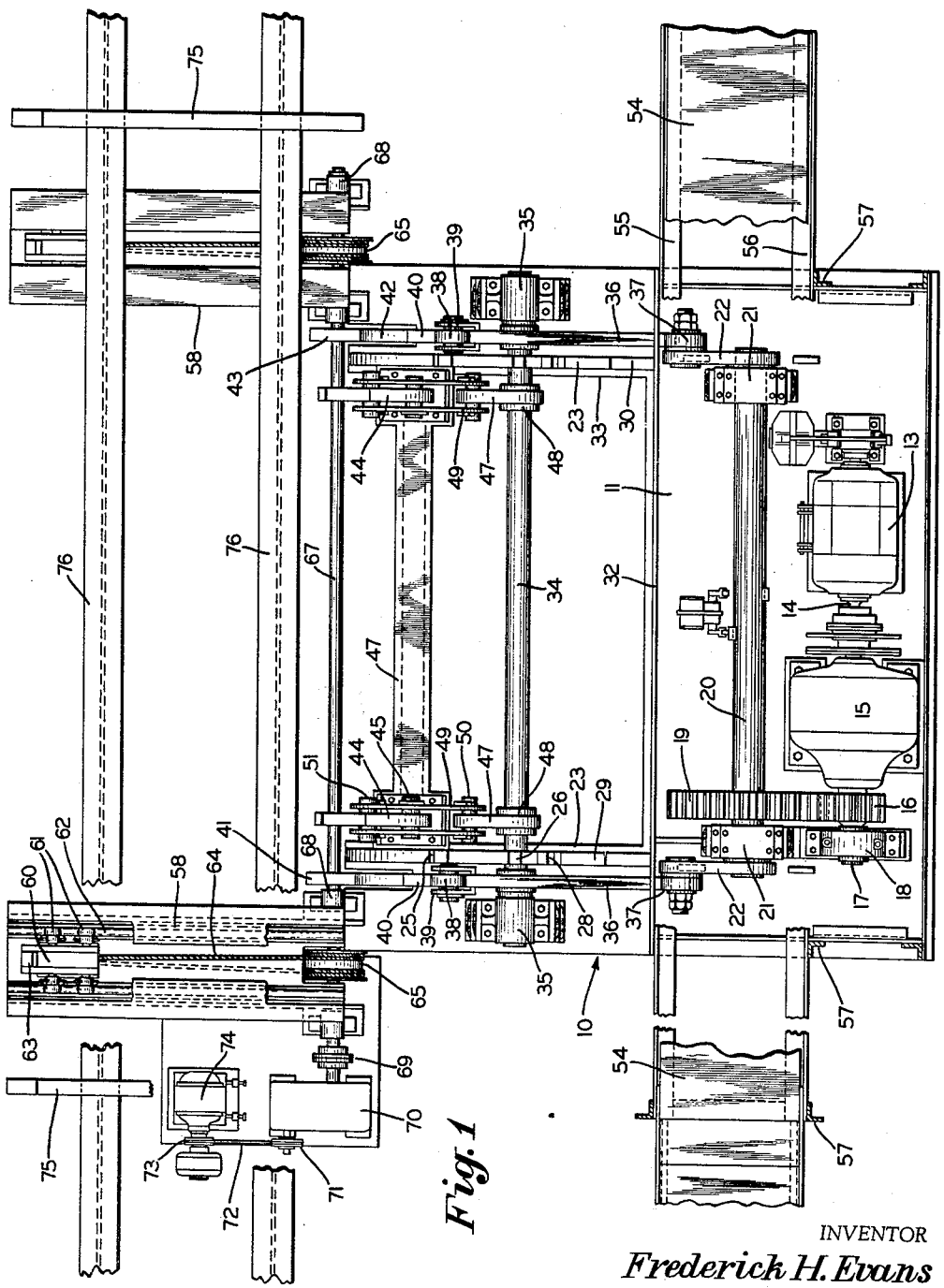
Fig. 1 is a top plan view of the improved slab-turning apparatus showing the parts in the initial position, parts being broken away for the purpose of illustration.

The apparatus includes a base 10 comprising bed 11 and depending side frame members 12 for supporting the slab-turning mechanism and drive means therefor at a suitable distance above the floor.

At the rear end of the bed 11 a reversing motor 13 is mounted, the shaft 14 thereof being operatively connected to a gear reduction 15. A pinion 16 is fixed upon the shaft 17 of the gear reduction, the outer end of said shaft being journalled in a bearing block 18 mounted upon the bed 11.

The pinion 16 meshes with a relatively large gear wheel 19 fixed upon the drive shaft 20 which is journalled in bearing blocks 21 mounted upon the bed 11 of the base. A crank arm 22 is fixed to each end of the drive shaft 20.

A spaced pair of arcuate rail members 23 is located upon the bed 11, forwardly of the drive shaft 20. Each rail member 23 has the forwardly and downwardly curved arcuate surface 24, a notch 25 being formed therein at a point spaced forwardly from the upper end of said arcuate surface.

Rearwardly of the arcuate surface 24, a squared notch 26 is formed in the edge of each rail, the rail then being inclined downwardly and rearwardly at 27, at which point an upwardly disposed V-shape projection 28 is formed. An upwardly and rearwardly inclined surface 29 is provided beyond the V-shape projection 28.

The inclined surface 29 is preferably formed upon a replaceable block 30 which may be replaced when the surface 29 becomes worn. It is also desirable that this surface be formed upon a replaceable block as the inclination of the surface 29 may be varied for handling slabs and the like of different dimensions.

It is also desirable that the entire upper portion of each rail member 23 be separable and replaceable as indicated at 31 in Fig. 2, so that when the wearing surface thereof becomes worn or damaged, the upper portion 31 may be replaced without the necessity of replacing the entire rail member 23.

A transversely disposed, vertical plate 32 is mounted upon the bed 11 at the rear of the rail member 23, and, as shown in Fig. 1, may be located against the inner sides of the rail members 23 and attached thereto by any usual and well known means for supporting the same.

A rocker shaft 34 is located concentrically with the arcuate surfaces 24 of the rail members 23 and is disposed transversely of said rail members, opposite ends thereof being located through suitable openings in the rail members and being journalled in bearing blocks 35 mounted upon the bed 11 on opposite sides of the rail members.

Links 36 are each pivotally connected at one end to one of the crank arms 22, as indicated at 37, the other end of each link being pivotally connected at 38 to a bracket 39 fixed upon the corresponding lift arm 40. Each lift arm is fixed to one end portion of the rocket shaft 34, between the adjacent rail member 23 and bearing block 35.

The outer end of each lift arm 40 extends outwardly beyond the arcuate surfaces 24 of the rail members, as indicated at 41, and has a rearwardly disposed projection 42 formed thereon and located inwardly of the arcuate surfaces 24 of the rail members. A flat, radially disposed surface 43 is provided upon the rear or upper edge of each lift arm extending from the projection 42 to the outer end of the lift arm.

A pair of manipulating arms 44 is fulcrumed as at 45, eccentric to the arcuate rail surfaces 24, upon bearing members 46 mounted on a transverse frame member 47 extending between the rail members 23 at a point forward of and above the rocker shaft 34.

Rocker arms 47 are fixed upon the rocker shaft 34 as indicated at 48, in longitudinal alignment with the manipulating arms 44. Links 49 are located in pairs, the rear ends of said links being pivoted as at 50 to the adjacent rocker arms 47 and the forward ends thereof being pivotally connected at 51 to the corresponding manipulating arm 44.

Each manipulating arm has a forwardly disposed projection 52, at a point spaced from its outer end, and a radially disposed flat surface 53 extending from the projection 52 to the outer end thereof. With this construction it will be seen that the lift arms and manipulating arms are operatively connected together so as to be simultaneously oscillated in either direction as desired by proper oscillation of the rocker shaft 20.

A platform 54 is located at the rear end of the rail members 23, above the driving mechanism, being supported by the angle members 55 and 56 connected to the transverse plate 32 and the vertical support members 57 respectively. The inspectors, scarfers or other operators may stand upon this platform.

A horizontally disposed charging platform 58 is located on the forward end of the rail members 23 for receiving slabs to be scarfed which may be deposited thereon by a lift truck, crane or the like. As best shown in Fig. 1, this platform comprises two similar units, one located at each side of the machine. Feeding means is provided in each unit of the charging platform for feeding slabs as indicated at 59 toward the rail members 23 so as to position the endmost slabs as indicated at 59a in Fig. 2 in position to be picked up by the radial surfaces 43 of the lift arms 40.

The feeding means in each unit of the charging platform is identical and only one will be described. Each feeding device comprises a carriage 60 having wheels 61 mounted upon longitudinally disposed rails 62 located below the charging platform 58.

An upwardly disposed projection 63 upon the carriage is adapted to engage the foremost of the slabs 59 for moving the slabs upon the platform 58 toward the rails 23. A cable 64 is connected at opposite ends to the carriage 60 and is snubbed around the driving pulley 65 at one end of the platform and passed around a pulley 66 at the other end thereof.

The drive pulleys 65 are mounted upon a shaft 67 journalled in bearings 68, one end of said shaft being connected as by a coupling 69 to a gear reduction 70. A pulley 71 upon the gear reduction is operatively connected by a belt 72 to the drive shaft 73 of the motor 74. It should be understood that a reversing motor is required so that the carriage 60 can be moved back to its initial position after it has been moved to the opposite end of the platform.

A discharge platform 75 is located above the charging platform 58 in position to receive scarfed slabs from the machine as will be later described. The discharge platform may be supported upon the transverse structural members 76.

In the operation of the apparatus for turning slabs so as to successively present the several surfaces thereof for inspection and scarfing, with the parts in the position shown in Fig. 2, a plurality of slabs as indicated at 59 is deposited upon the charging platforms 58 by a fork lift truck, crane or the like.

The motor 74 of the feeding device is operated to move the carriages 60 thereof toward the rail members 23, or to the right as viewed in Fig. 2, so as to position the endmost slab 59a adjacent to the arcuate edges 24 of the rail members in position to be picked up by the radial surfaces 43 of the lift arms 40 when they are moved upward or in clockwise direction as viewed in Fig. 2.

The lift arms 40 will be moved in clockwise direction until they reach the position indicated in broken lines at 40a in Fig. 3, at which time the lower edge of the slab 59 will drop into the notches 25 in the arcuate surfaces of the rail members 23.

The arms will then be moved in counter-clockwise direction to the broken line position shown at 40b in Fig. 3, permitting the slab to drop back to the broken line position indicated at 59c, the outer edge of the slab resting upon the radially disposed surfaces 43 of the lift arms 40.

As the arms are moved further in counter-clockwise direction to the full line position shown in Fig. 3, the slab will be received flatwise upon the arcuate surfaces 24 of the rail members 23. The motion of the arms will then be reversed and they will be moved in clockwise direction to the full line position shown in Fig. 4, at which time the trailing edge of the slab will drop into the notch 26, the undersurface of the slab resting upon the rearwardly disposed projections 42 of the lift arms 40.

The arms will then be moved in counter-clockwise direction to the position shown in Fig. 5, permitting the slab to slide down upon the inclined surfaces 27 of the rail members, the lower edge of the slab resting upon the V-shape projections 28 as shown in Fig. 5, at which point the upper edge of the slab may be inspected and scarfed.

The arms are again moved in clockwise direction, the projections 42 upon the lift arms 40 pushing the slab away from the inclined surfaces 27 of the rail members, the lower edge of the slab pivoting upon the V-shape projections 28 of the rail members as shown in broken lines at 59d in Fig. 6, the slab then dropping to the full line position shown in Fig. 6 with one flat surface thereof resting upon the inclined surfaces 29 of the replaceable blocks 30 and the lower edge of the slab resting against the V-shape projections 28.

In this position the uppermost surface of the slab may be inspected and if desired it may also be scarfed by workmen standing upon the platform 54, although it is preferable that the scarfing operation be performed at a later position as will be hereinafter described.

After inspection of the upper flat surface of the slab in the position shown in Fig. 6, the arms are moved again in counterclockwise direction, the manipulating arms 44 picking up the slab from off of the inclined surfaces 29 and moving to the broken line position shown in Fig. 7 with the slab in the broken line position shown at 59e, the lower edge thereof resting upon the rearwardly disposed projections 52 of the manipulating arms and the lower flat surface of the slab resting against the radial surfaces 53 thereof, as shown in broken lines in Fig. 7.

The arms are then moved in clockwise direction to the full line position shown in Fig. 7, the slab dropping to the nearly flat position shown in full lines with its lower edge contacting the arcuate surfaces 24 of the rail members 23 and its opposite edge contacting the radially disposed surfaces 53 of the manipulating arms. This is the preferred position in which the upper flat surface of the slab may then be scarfed.

After this surface of the slab has been scarfed, the arms may continue to move in clockwise direction back to the position shown in Fig. 5 when the other edge of the slab will be upward and may be scarfed.

The arms are then further moved in clockwise direction to the position of Fig. 6, the projections 42 upon the lift arms 40 tilting the slab through the broken line position to the full line position shown in Fig. 6, with the other flat side of the slab then upward. At this point this other flat side of the slab may be inspected and if desired may be scarfed, although it is desirable that it be moved back to the position shown in Fig. 7, at which time the unscarfed flat surface of the slab is upward and may be scarfed.

The arms are then further moved in clockwise direction to the position of Fig. 5 dropping the slab, which has then been scarfed on all four surfaces, to the position shown in said figure, resting upon the inclined surfaces 27 of the rail members 28 with its lower edge resting upon the projections 28 thereof.

The arms are then moved in counter-clockwise direction, the slab being picked up by the manipulating arms and resting flatwise upon the projections 52 thereof as shown in full lines in Fig. 8. Further movement of the arms in this direction to the broken line position shown in Fig. 8 will deposit the slab upon the discharge platform 75, as shown in broken lines in said figure.

At this point the parts are back to the position shown in Fig. 1 and the operation may be repeated for scarfing additional slabs, it being understood that the feed mechanism for the charging platforms is operated each time to bring another slab in position upon the charging platforms to be picked up by the lift arms.

As each successive slab is deposited upon the discharge platform 75 it will be obvious that it will push the previously deposited slab or slabs forwardly thereon. When the discharge platform has been filled with scarfed slabs they may be removed by a fork lift truck, crane or the like.

From the above it will be obvious that the improved slab-turning apparatus may be operated continually, picking up slabs one at a time from the charging platforms, manipulating them over the arcuate surfaces and notches of the rail members to turn them as above described so that each edge and each flat surface thereof is successively presented to the operators for inspection and scarfing, after which the scarfed slab is discharged from the machine onto the discharge platform. Thus it is only necessary that from time to time a new supply of unscarfed slabs be placed upon the charging platform and the scarfed slabs be removed from the discharge platform.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, lift arms and manipulating arms journalled adjacent to said rails, and means for simultaneously oscillating said lift arms and manipulating arms, said last named means comprising means for moving the lift arms rearwardly and upwardly to move a slab edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab in said second notches, for then moving said lift arms forwardly to drop the leading edge of the slab upon said V-shaped projections, for then moving said lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus.

2. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, lift arms and manipulating arms journalled adjacent to said rails, the lift arms being journalled concentric with the arcuate edges of the rails and the manipulating arms being journalled upon a center located forwardly and above the journal of the lift arms, and means for simultaneously oscillating said lift arms and manipulating arms, said last named means comprising means for moving the lift arms rearwardly and upwardly to move a slab edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab in said second notches, for then moving said lift arms forwardly to drop the leading edge of the slab upon said V-shaped projections, for then moving said lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus.

3. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, lift arms and manipulating arms journalled adjacent to said rails, angular projections spaced from the outer ends of the left arms and disposed toward the manipulating arms, angular projections spaced from the outer ends of the manipulating arms and disposed toward the lift arms, and means for simultaneously oscillating said lift arms and manipulating arms, said last named means comprising means for moving the lift arms rearwardly and upwardly to move a slab edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab in said second notches, for then moving said lift arms forwardly to drop the leading edge of the slab upon said V-shaped projections, for then moving said lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus.

4. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, a charging platform located adjacent the lower ends of said arcuate edges, a discharge platform spaced above said charging platform, lift arms and manipulating arms journalled adjacent to said rails, and means for simultaneously oscillating said lift arms and manipulating arms, said last named means comprising means for moving the lift arms rearwardly and upwardly to pick up a slab from the charging platform and move it edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab into said second notches, for then moving said lift arms forwardly to drop the leading edge of the slab upon said V-shaped projections, for then moving said lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus and place it on said discharge platform.

5. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, a charging platform located adjacent the lower end of said arcuate edges, a discharge platform spaced above said charging platform, lift arms and manipulating arms journalled adjacent to said rails, angular projections spaced from the outer ends of the lift arms and disposed toward the manipulating arms, angular projections spaced from the outer ends of the manipulating arms and disposed toward the lift arms, and means for simultaneously oscillating said lift arms and manipulating arms, said last named means comprising means for moving the lift arms rearwardly and upwardly to pick up a slab from the charging platform and move it edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab into said second notches, for then moving said lift arms forwardly to drop the leading edge of the slab upon said V-shaped projections, for then moving said lift arms rearwardly to position the slab flatwise upon said rearwardly and upwardly inclined surface, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus and place it on said discharge platform.

6. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, a charging platform located adjacent the lower ends of said arcuate edges, means for moving slabs upon said charging platform toward said rails, a discharge platform spaced above said charging platform, lift arms and manipulating arms journalled adjacent to said rails, and means for simultaneously oscillating said lift arms and manipulating arms, said last named means comprising means for moving the lift arms rearwardly and upwardly to pick up a slab from the charging platform and move it edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab into said second notches, for then moving said lift arms forwardly to drop the leading edge of the slab upon said V-shaped projections, for then moving said lift arms rearwardly to position the slab flatwise upon said rearwardly and upwardly inclined surface, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus and place it on said discharge platform.

7. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, a charging platform located adjacent the lower ends of said arcuate edges, means for moving slabs upon said charging platform toward said rails, a discharge platform spaced above said charging platform, lift arms and manipulating arms journalled adjacent to said rails, angular projections spaced from the outer ends of the lift arms and disposed toward the manipulating arms, angular projections spaced from the outer ends of the manipulating arms and disposed toward the lift arms, and means for simultaneously oscillating said lift arms and manipulating arms, said last named means comprising means for moving the lift arms rearwardly and upwardly to pick up a slab from the charging platform and move it edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab into said second notches, for then moving said lift arms forwardly to drop the leading edge of the slab upon said V-shaped projections, for then moving said lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for then moving the manipulating arms forwardly to discharge the slab from the apparatus and place it on said discharge platform.

8. Apparatus for turning slabs and the like having angularly arranged connected longitudinal faces, said apparatus comprising spaced parallel rails, each rail having an arcuate edge with an angular notch at an intermediate point therein and a second notch at the rear end of the arcuate edge, a rearwardly and downwardly inclined surface extending downwardly from said second notch, a V-shape projection at the lower end of said inclined surface and a rearwardly inclined surface extending upwardly from said V-shape projection, a rocker shaft journalled in the apparatus concentric with said arcuate edges, lift arms fixed upon said rocker shaft, manipulating arms journalled at a point eccentric to said rocker shaft, a rocker arm upon said rocker shaft, a link connecting the rocker arm to the manipulating arm, angular projections spaced from the outer ends of the lift arms and disposed toward the manipulating arms, angular projections spaced from the outer ends of the manipulating arms and disposed toward the lift arms, and means for oscillating said rocker shaft for moving the lift arms rearwardly and upwardly to move a slab edgewise upon said arcuate edges and drop it edgewise into said first named notches, for then moving the lift arms forwardly and downwardly to position the slab flatwise upon said arcuate edges with one side of the slab upward, for then moving said lift arms upwardly and rearwardly to drop the trailing edge of the slab in said second notches, for then moving said lift arms forwardly to drop the leading edge of the slab upon said V-shaped projections, for then moving the lift arms rearwardly to position the slab flatwise upon said rearwardly and upwardly inclined surfaces, for then moving the manipulating arms first forwardly and then rearwardly to pick up the slab from said rearwardly and upwardly inclined surfaces and place it flatwise upon said arcuate surfaces with the opposite side of the slab upward, and for finally moving said manipulating arms forwardly to discharge the slab from the apparatus.

References Cited in the file of this patent

UNITED STATES PATENTS

| 2,486,819 | Brown | Nov. 1, 1949 |
| 2,744,639 | Evans | May 8, 1956 |
| 2,822,930 | MacGregor | Feb. 11, 1958 |

FOREIGN PATENTS

| 110,214 | Sweden | Apr. 4, 1944 |